United States Patent
Wang et al.

(10) Patent No.: US 12,172,541 B2
(45) Date of Patent: Dec. 24, 2024

(54) ELECTRIC VEHICLE CHARGING MANAGEMENT METHODS AND SYSTEMS FOR COMMUNITY USERS

(71) Applicant: Noodoe Group Inc., Wilmington, DE (US)

(72) Inventors: John C. Wang, Taipei (TW); Yi-An Hou, Taipei (TW); Te-Chuan Liu, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 517 days.

(21) Appl. No.: 17/521,932

(22) Filed: Nov. 9, 2021

(65) Prior Publication Data
US 2022/0242267 A1   Aug. 4, 2022

(30) Foreign Application Priority Data
Jan. 29, 2021   (TW) ................. 110103565

(51) Int. Cl.
*H02J 7/00*   (2006.01)
*B60L 53/65*   (2019.01)
*B60L 53/66*   (2019.01)
*B60L 53/68*   (2019.01)

(52) U.S. Cl.
CPC ............. *B60L 53/65* (2019.02); *B60L 53/665* (2019.02); *B60L 53/68* (2019.02)

(58) Field of Classification Search
USPC ................................................... 320/109
See application file for complete search history.

(56) References Cited

U.S. PATENT DOCUMENTS

| | | | | |
|---|---|---|---|---|
| 10,026,068 | B2* | 7/2018 | Kanayama | G06Q 20/145 |
| 2011/0191265 | A1* | 8/2011 | Lowenthal | B60L 53/665 |
| | | | | 705/412 |
| 2016/0207413 | A1* | 7/2016 | Atluri | H02J 3/322 |
| 2017/0345107 | A1* | 11/2017 | Hirata | G06Q 30/04 |

* cited by examiner

*Primary Examiner* — Samuel Berhanu
(74) *Attorney, Agent, or Firm* — McClure, Qualey & Rodack, LLP

(57) ABSTRACT

Electric vehicle charging management methods and systems for community users are provided. A server receives a charging request via a network from a charging station or a mobile device, wherein the charging request includes at least a user identification code and a charging station identification code. A specific household in a community is retrieved from a database according to the user identification code. The server instructs the charging station to perform a charging operation through the network, and continuously obtains charging status information from the charging station, wherein the charging status information includes at least a charging time or a charging power. When the server receives a charging end signal from the charging station, a charging fee is calculated based on the charging status information, and generates bill information for the specific household information in the community based on the charging fee.

17 Claims, 11 Drawing Sheets

ELECTRIC VEHICLE CHARGING MANAGEMENT METHODS AND SYSTEMS FOR COMMUNITY USERS

BACKGROUND OF THE INVENTION

Field of the Invention

The disclosure relates generally to charging management methods and systems thereof, and, more particularly to electric vehicle charging management methods and systems for community users.

Description of the Related Art

Recently, with the rising awareness of environmental protection and electric vehicle technology advances, the development of electric vehicles powered h electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Most of the power facility in the field has already been constructed. It is expensive to update the power facility, such as the capacity of the electric panel, and the construction time is very time-consuming. Generally, the number of electric vehicle charging stations that can be installed in a single charging field is limited by the existing maximum load capacity of the existing field. Therefore, in the case of limited electric vehicle charging stations, the driver of an electric vehicle may have to wait time because the charging station is in use, or need to find other nearby charging stations for charging operations, which causes inconvenience in use, and reduces the willingness to adopt electric vehicles.

The home is often the best charging place for electric vehicle users. However, for users living in communities, such as collective housing, they are often unable to install charging equipment for electric vehicles in their own parking spaces due to some restrictions in the community, such as the existing power restrictions in the community, and the safety considerations of the community management committee. In these communities, common electric vehicle charging stations are usually set to allow electric vehicle residents in the community to perform electric vehicle charging operations. Because of such planning, it is also difficult for management of the electric vehicle charging for users in the community.

BRIEF SUMMARY OF THE INVENTION

Electric vehicle charging management methods and systems for community users are provided.

In an embodiment of an electric vehicle charging management method for community users, a server receives a charging request via a network from a charging station or a mobile device, wherein the charging request includes at least a user identification code and a charging station identification code. A specific household in a community is retrieved from a database according to the user identification code. The server instructs the charging station to perform a charging operation through the network, and continuously obtains charging status information from the charging station, wherein the charging status information includes at least a charging time or a charging power. When the server receives a charging end signal from the charging station, a charging fee is calculated based on the charging status information, and generates bill information for the specific household information in the community based on the charging fee.

An embodiment of an electric vehicle charging management method for community users applied to a charging field comprising a plurality of electric vehicle charging stations comprises at least a first charging station and a server. The server connects to the respective electric vehicle charging station of the charging field via a network, and receives a charging request from the first charging station or a first mobile device, wherein the charging request includes at least a user identification code and a first charging station identification code corresponding to the first charging station. The server retrieves specific household information in a community from a database according to the first user identification code, instructs the first charging station corresponding to the first charging station identification code to perform a first charging operation through the network, and continuously obtains first charging status information from the first charging station through the network, wherein the first charging status information includes at least a charging time or a charging power. The server receives a charging end signal from the first charging station through the network, and in response to the charging end signal, calculates a charging fee based on the charging status information, and generates bill information for the specific household information in the community based on the charging fee.

In some embodiments, the server receives a second charging request via a network from a second charging station or a second mobile device, wherein the second charging request includes at least a second user identification code and a second charging station identification code corresponding to the second charging station. The server retrieves the specific household information in the community from the database according to the second user identification code, wherein the first user identification code and the second user identification code both correspond to the specific household information. The server instructs the second charging station to perform a second charging operation through the network, and continuously obtains second charging status information from the second charging station. When the server receives a charging end signal through the network, it calculates a second charging fee according to the second charging status information, and integrates the second charging fee into the bill information corresponding to the specific household information.

In some embodiments, the server is connected to a management fee calculation system in the community via the network to integrate the first charging fee into a management fee receipt corresponding to specific household information.

In some embodiments, a charging rate table is provided, wherein the charging rate table includes a peak charging rate and an off-peak charging rate, and the server calculates the first charging fee based on the first charging status information and the charging rate table.

In some embodiments, the server performs an authentication operation according to the first user identification code or the specific household information, and the server instructs the first charging station to perform the first charging operation through the work according to the result of the authentication operation.

In some embodiments, the authentication operation determines whether the specific household information has an arrears note, and when the specific household information has an arrears note, the server refuses the first charging station to perform the first charging operation, and sends a message to the first mobile device via the network to notify the result of the authentication operation.

In some embodiments, the server generates an online payment link based on the arrears amount of the specific household information, and determine whether the arrears amount has been paid through the online payment link. When the amount of arrears has been paid through the online payment link, the server removes the arrears note of the specific household information, and instructs the first charging station to perform the first charging operation through the network.

In some embodiments, when the data corresponding to the first user identification code does not exist in the database, the server generates a payment option link and transmits the payment option link to the first mobile device via the network. The server receives through the network the payment information entered by the first mobile device through the payment option link, and instructs the first charging station to perform the first charging operation through the network according to the payment information, and continues to obtain the first charging status information of the first charging operation from the first charging station. When the server receives the charging end signal through the network, it calculates the first charging fee according to the first charging status information, and collects the first charging fee according to the payment information.

In some embodiments, it is determined whether the first user identification code is a specific identification code. When the first user identification code is the specific identification code, the server instructs the first charging station to perform the first charging operation through the network without charging any charging fee for the first charging operation.

Electric vehicle charging management methods for community users may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
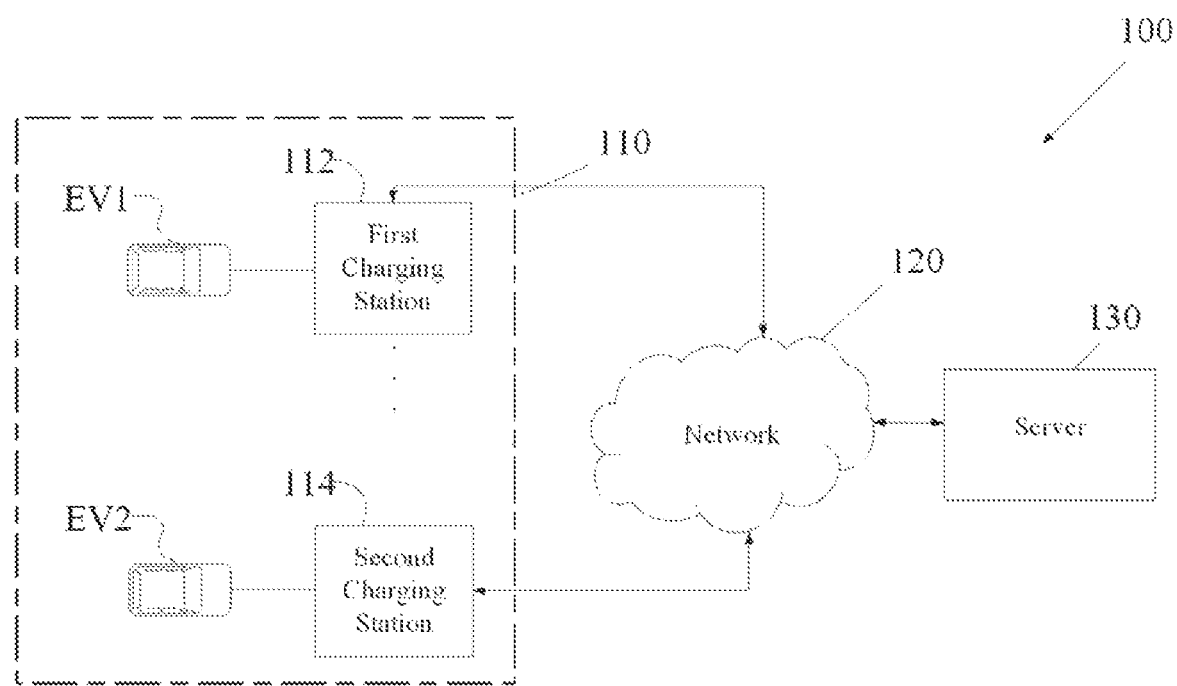
FIG. 1 is a schematic diagram illustrating an embodiment of an electric vehicle charging management system unity users of the invention.

FIG. 1 is a schematic diagram illustrating an embodiment of an electric vehicle charging management system for community users of the invention. The electric vehicle charging management system for community users 100 can be used in a charging filed 110 with a plurality of electric vehicle charging stations. It is noted that, the charging filed 110 has a power limitation. As shown in FIG. 1, the electric vehicle charging management system for community users 100 comprises a plurality of electric vehicle charging stations, e.g., a first charging station 112 and a second charging station 114, and a server 130 respectively connected with the first charging station 112 and the second charging station 114 via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the first charging station 112 and the second charging station 114 via the network 120, and transmit related signals to the first charging station 112 and the second charging station 114. The first charging station 112 and the second charging station 114 can perform related operations according to the signals received from the server 130. For example, when the electric vehicle EV1 is coupled to the first charging station 112 through a charging gun of the first charging station 112 for a charging operation, the first charging station 112 can continuously transmit charging information corresponding the charging operation of the electric vehicle EV1 via the network 120, and the server 130 can receive the charging information of the corresponding charging operation from the first charging station 112 via the network 120. Similarly, when the electric vehicle EV2 is coupled to the second charging station 114 through a charging gun of the second charging station 114 to perform a charging operation, the second charging station 114 can continuously transmit the charging information corresponding the charging operation of the electric vehicle EV2 via the network 120, the server 130 can receive the charging information of the corresponding charging operation from the second charging station 114 via the network 120.

It is noted that the user can connect the electric vehicle EV1 and the first charging station 112 to each other, such as inserting a charging gun into the charging port of the electric vehicle to send a charging request corresponding to the first charging station 112 to use the first charging station 112. The first charging station 112 performs a charging operation for the electric vehicle EV1. Similarly, the user can connect the electric vehicle EV2 and the second charging station 114 to each other, such as inserting a charging gun into the charging port of the electric vehicle to send a charging request corresponding to the second charging station 114 to use the second charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the first charging station 112 via the network 120, so that the first charging station 112 outputs power to the electric vehicle EV1, such as an electric scooter or an electric car, which is electrically connected to it, or prohibits the first charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the first charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use err RFID card to approach an induction area (not shown in FIG. 1) on the first charging station 112 to generate a corresponding charging request, and sent it to the server 130 via the network 120. It is reminded that, in some embodiments, each community user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle.

Figure 2:
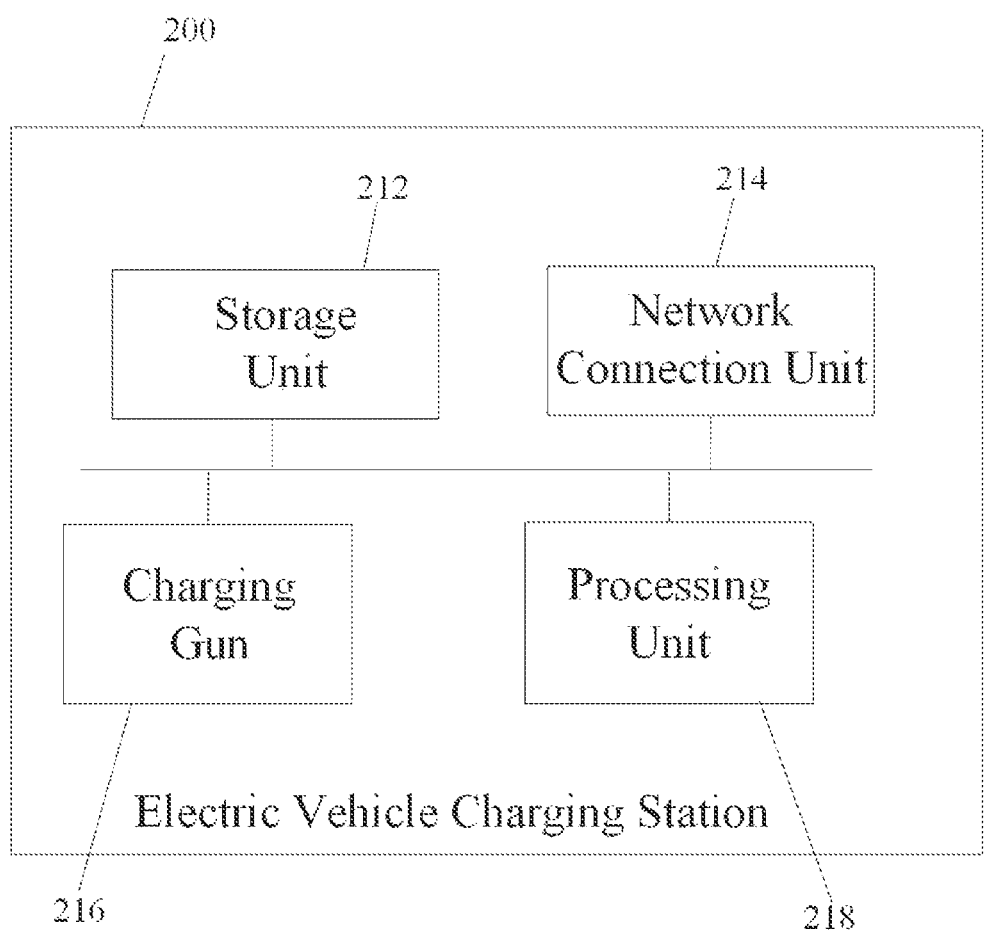
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the first charging station 112 and the second charging station 114 in FIG. 1, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216 and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the electric vehicle charging management methods for community users of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited thereto. In one embodiment, the processing unit 218 may use the network connection unit 214 to transmit the power state of the corresponding electric vehicle through a network for a cloud management server, such as the cloud server 130, for subsequent charging management. In another embodiment, the processing unit 218 can obtain the power parameter of a charging operation from the server 130, determine the output power according to the power parameter received from the server 130, and output the power to at least one electric vehicle through the charging gun 216 to perform the charging operation. It is noted that, in some embodiments, the electric vehicle charging station 200 may comprise an RFID reading unit for sensing information of an RFID card, such as a user ID code of a community user.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
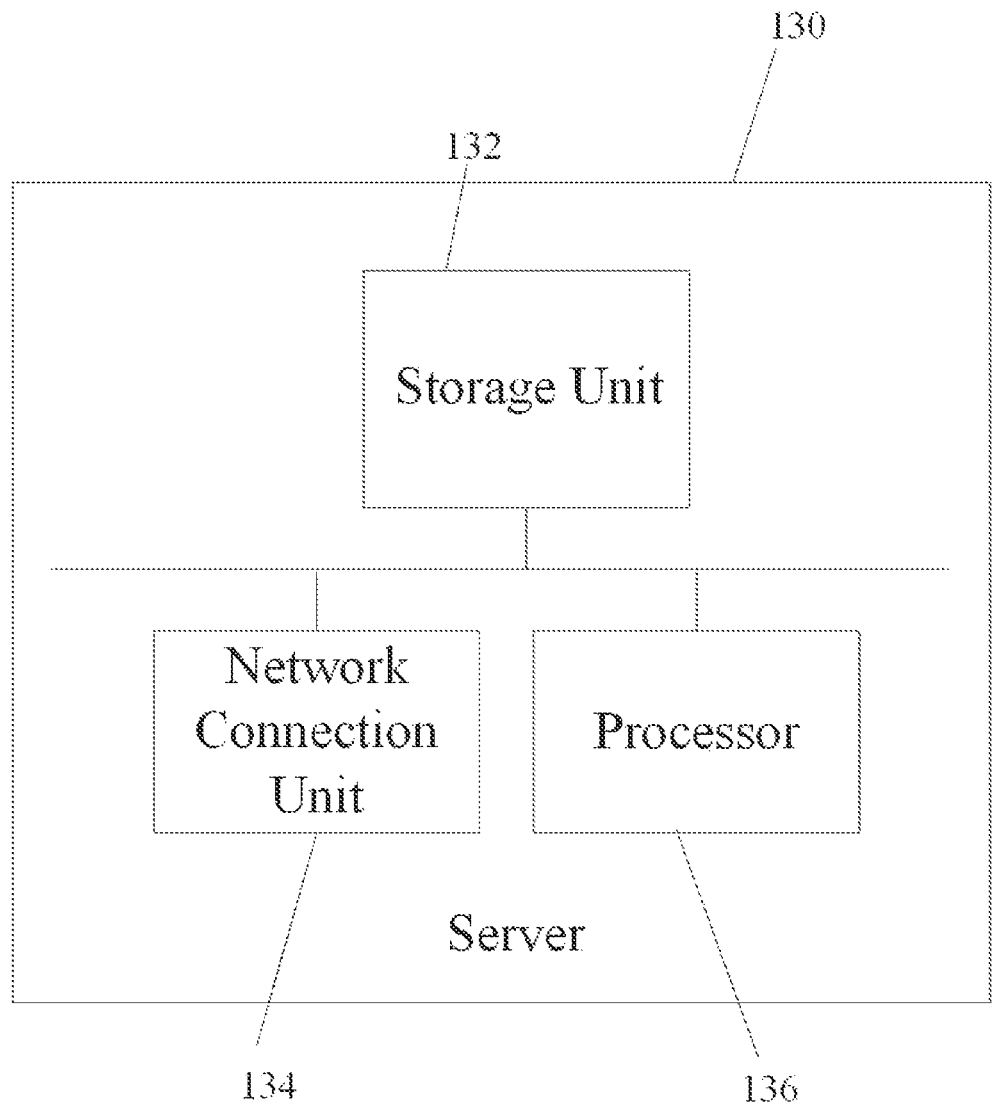
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134 and a processor 136. It is noted that, the server 130 can receive various data corresponding to a plurality of electric vehicle charging stations in a charging field of the community. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is understood that, in some embodiments, the storage unit 132 may comprise a database (not shown in FIG. 3) for recording relevant information of the corresponding individual households in the corresponding community, such as household information and the corresponding user identification code. It is noted that, in some embodiments, one household may register multiple users. In other words, one household information can correspond to multiple user identification codes. In addition, in some embodiments, the database can also record whether an individual household has arrears, such as arrear notes of management fee or charging fee. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the electric vehicle charging management methods for community users of the invention. The relevant details will be described later. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
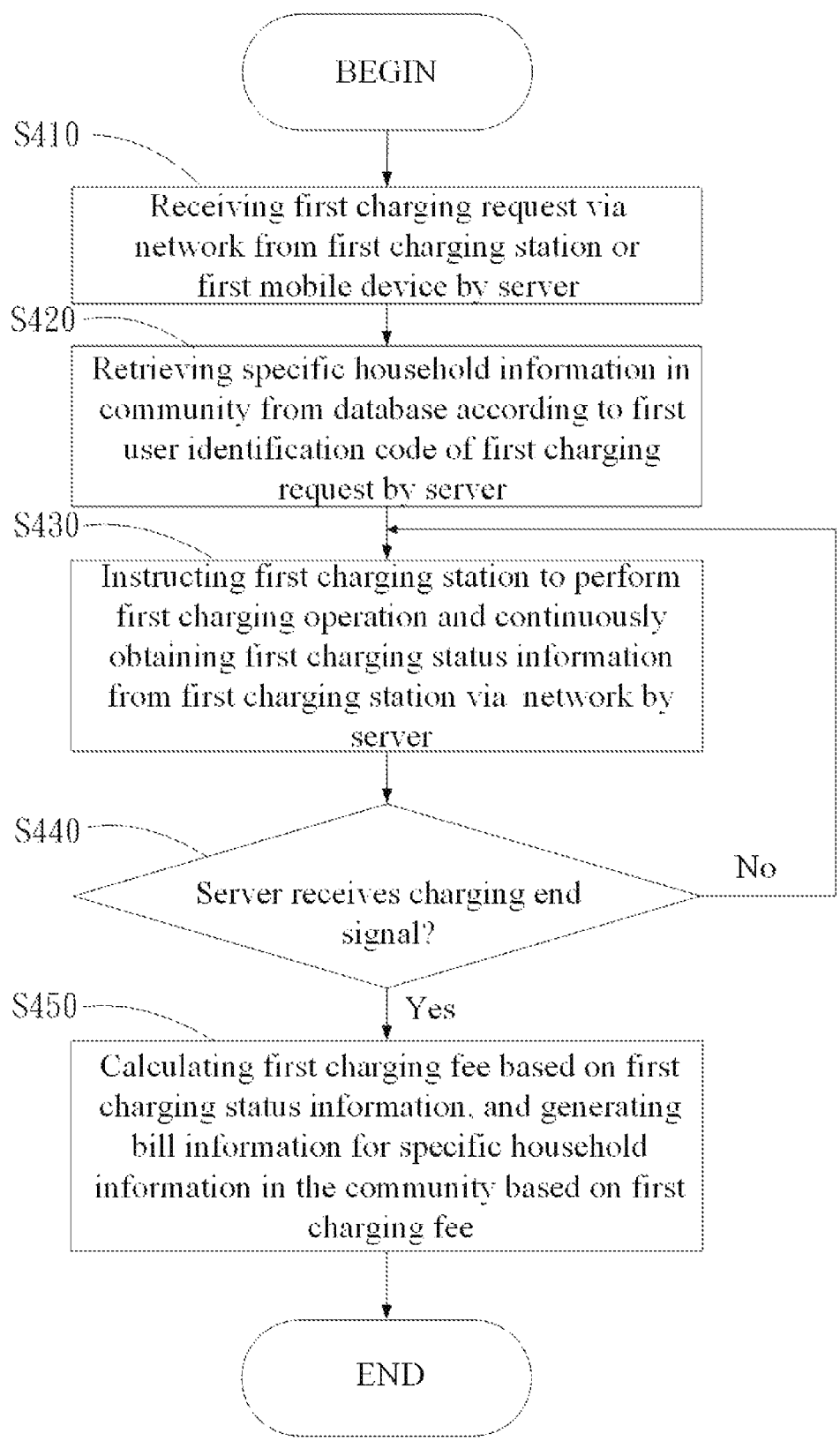
FIG. 4 is a flowchart of an embodiment of an electric vehicle charging management method for community users of the invention.

FIG. 4 is a flowchart of an embodiment of an electric vehicle charging management method for community users of the invention. The electric vehicle charging management method for community users of the invention can be applied to a charging field of a community. The charging field includes a plurality of electric vehicle charging stations and has a power limit. Individual electric vehicle charging stations can be electrically coupled with a remote server through a network.

First, in step S410, the server receives a first charging request from a first charging station or a first mobile device through the network. The first charging request includes at least a first user identification code and a first charging station identification code of the first charging station. It should be noted that in some embodiments, a user can connect the electric vehicle EV1 and the first electric vehicle charging station to each other, such as plugging the charging gun into the charging interface of the electric vehicle, to send the charging request corresponding to the first charging station. In some embodiments, the server may directly or indirectly receive a charging request from a mobile device of the owner of the electric vehicle EV1. It is noted that in some embodiments, the user can scan a Quick Response Code (QR code) on the first electric vehicle charging station through the scanning function of the application to generate the charging request. In some embodiments, the user can use an application in the mobile device to select the first charging station and execute an activation function to generate the above-mentioned charging request. In some embodiments, the owner of the electric vehicle EV1 can use an RFID card to approach the induction area on the first charging station to generate a corresponding charging request. Next, in step S420, the server retrieves specific household information in a community from a database according to the first user identification code. Then, in step S430, the server instructs the first charging station perform a first charging operation through the network, and continuously obtains first charging status information from the first charging station through the network, wherein the first charging status information includes at least a charging time or a charging amount of power. It should be noted that the first charging status information includes at least a charging time or a charging amount of power. Next, in step S440, the server determines whether a charging end signal is received. It should be noted that in some embodiments, when the user pulls the charging gun out of the charging station, the charging station can send the charging end signal to the server. In some embodiments, when the charging operation of the electric vehicle is completed, in other words, when the electric vehicle is fully charged, the charging station can transmit the charging end signal to the server. In addition, in some embodiments, the user can use the application in the mobile device to execute a charging end function to send a charging end signal to the server. When the server does not receive the charging end signal (No in step S440), the flow continues the operation of step S430. When the server receives the charging end signal (Yes in step S440), in step S450, it calculates first charging fee according to the first charging status information, and generates bill information for the specific household information in the community based on the charging fee.

Figure 5:
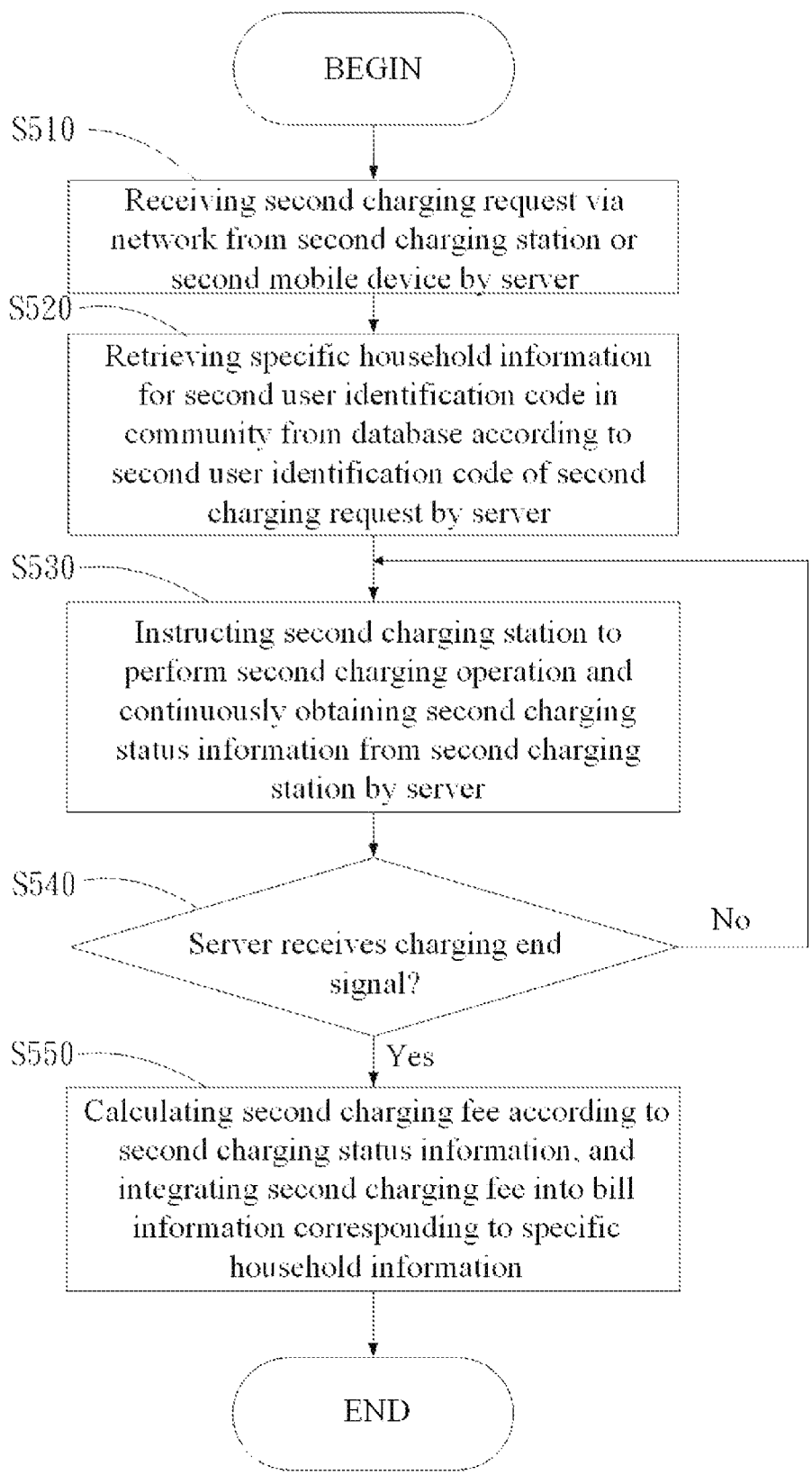
FIG. 5 is a flowchart of another embodiment of an electric vehicle charging management method for community users of the invention.

FIG. 5 is a flowchart of another embodiment of an electric vehicle charging management method for community users of the invention. The electric vehicle charging management method for community users of the invention can be applied to a charging field of a community. The charging field includes a plurality of electric vehicle charging stations and has a power limit. Individual electric vehicle charging stations can be electrically coupled with a remote server through a network. In this embodiment, the charging fees of different users of the same household in the community will be automatically integrated.

First, in step S510, the server receives a second charging request from a second charging station or a second mobile device through the network. The second charging request includes at least a second user identification code and a second charging station identification code of the second charging station. Similarly, in some embodiments, a user can connect the electric vehicle EV2 and the second charging station to each other, such as plugging the charging gun into the charging interface of the electric vehicle, to send the charging request corresponding to the second charging station. In some embodiments, the server may directly or indirectly receive a charging request from a mobile device of the owner of the electric vehicle EV2. It is noted that in some embodiments, the user can scan a Quick Response Code (QR code) on the second charging station through the scanning function of the application to generate the charging request. In some embodiments, the user can use an application in the mobile device to select the second charging station and execute an activation function to generate the above-mentioned charging request. In some embodiments, the owner of the electric vehicle EV2 can use an RFID card to approach the induction area on the second charging station to generate a corresponding charging request. Next, in step S520, the server retrieves the specific household information in the community from the database according to the second user identification code. It should be noted that the first user identification code in the embodiment of FIG. 4 and the second user identification code both correspond to the specific household information. In other words, the first user identification code and the second user identification code represent different users in the same household. Then, in step S530, the server instructs the second charging station to perform a second charging operation through the network, and continuously obtains second charging status information from the second charging station. Similarly, the second charging status information includes at least a charging time or a charging amount of power. Next, in step S540, the server determines whether a charging end signal corresponding to the second charging operation is received. Similarly, in some embodiments, when the user pulls the charging gun out of the charging station, the charging station can send the charging end signal to the server. In some embodiments, when the charging operation of the electric vehicle is completed, in other words, when the electric vehicle is fully charged, the charging station can transmit the charging end signal to the server. In addition, in some embodiments, the user can use the application in the mobile device to execute a charging end function to send a charging end signal to the server. When the server does not receive the charging end signal (No in step S540), the flow continues the operation of step S530. When the server receives the charging end signal (Yes in step S540), in step S550, it calculates a second charging fee according to the second charging status information, and integrates the second charging fee into the bill information corresponding to the specific household information. In other words, the charging tees incurred by different users in the same household ill be integrated into the same billing information.

Figure 6:
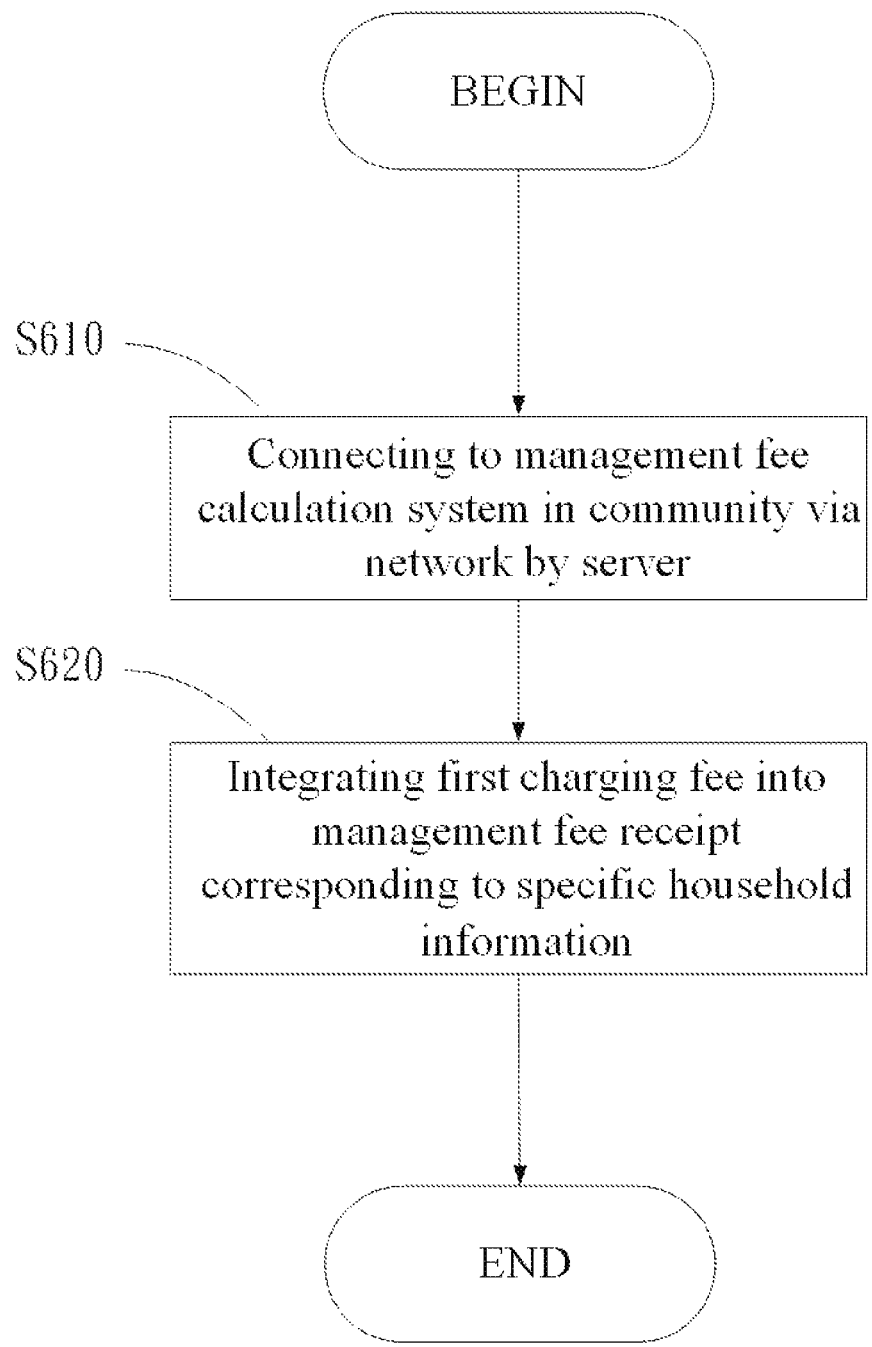
FIG. 6 is a flowchart of another embodiment of an electric vehicle charging management method for community users of the invention.

FIG. 6 is a flowchart of another embodiment of an electric vehicle charging management method for community users of the invention. In this embodiment, the corresponding charging fee of the household can be integrated into the management fee calculation system of the community. After the server generates the first charging fee for the first charging operation, in step S610, the se connects to a management fee calculation system in the community through the network, and in step S620, integrates the first charging fee into a management fee receipt corresponding to specific household information. It should be noted that, when the server generates the second charging fee as described in the embodiment of FIG. 5, the server can also integrate the second charging fee into the management fee receipt corresponding to the specific household information.

Figure 7:
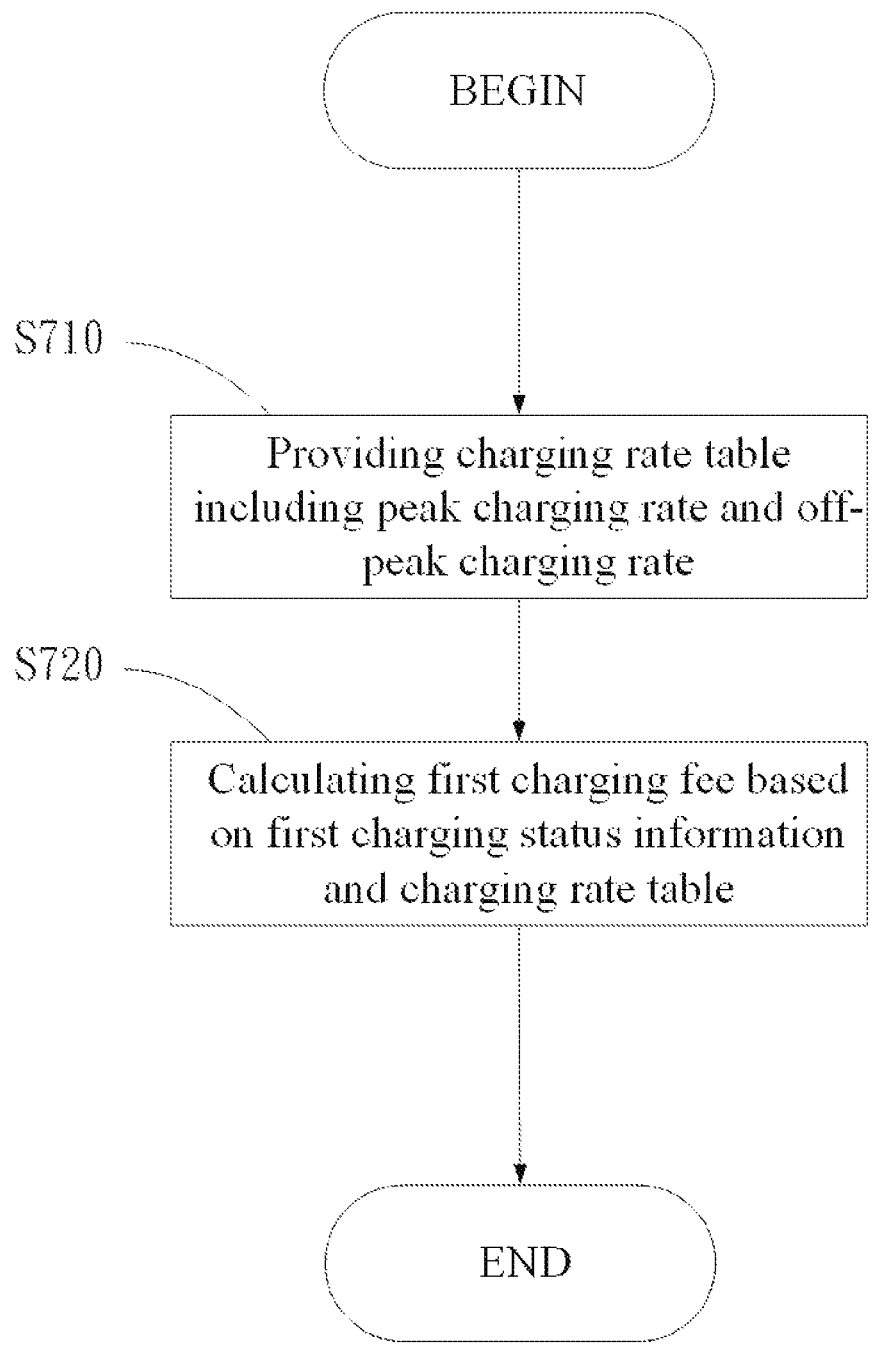
FIG. 7 is a flowchart of another embodiment of a charging fee calculation method of the invention.

It is understood that, in some embodiments, due to the limited electric vehicle charging stations in the community, and most users focus on charging in a specific period of time therefore, in order to enable the charging station to be fully used in different periods of time, the present invention can provide a diversion mechanism and implement it with the corresponding billing mechanism. FIG. 7 is a flowchart of an embodiment of a charging fee calculation method of the invention. First, in step S710, a charging rate table is provided in the server, wherein the charging rate table can record a peak period and a corresponding peak charging rate, and an off-peak period and a corresponding off-peak charging rate. It should be noted that, in some embodiments, the server can provide an interface through which relevant personnel in the community can set the charging rate table. Next, in step S720, the server calculates the first charging fee based on the first charging status information and the charging rate table. As mentioned above, the first charging status information includes at least a charging time or a charging amount of power. Through the charging time, the corresponding charging rate can be found, and the charging fee can be calculated based on the charging amount of power and the charging rate.

Figure 8:
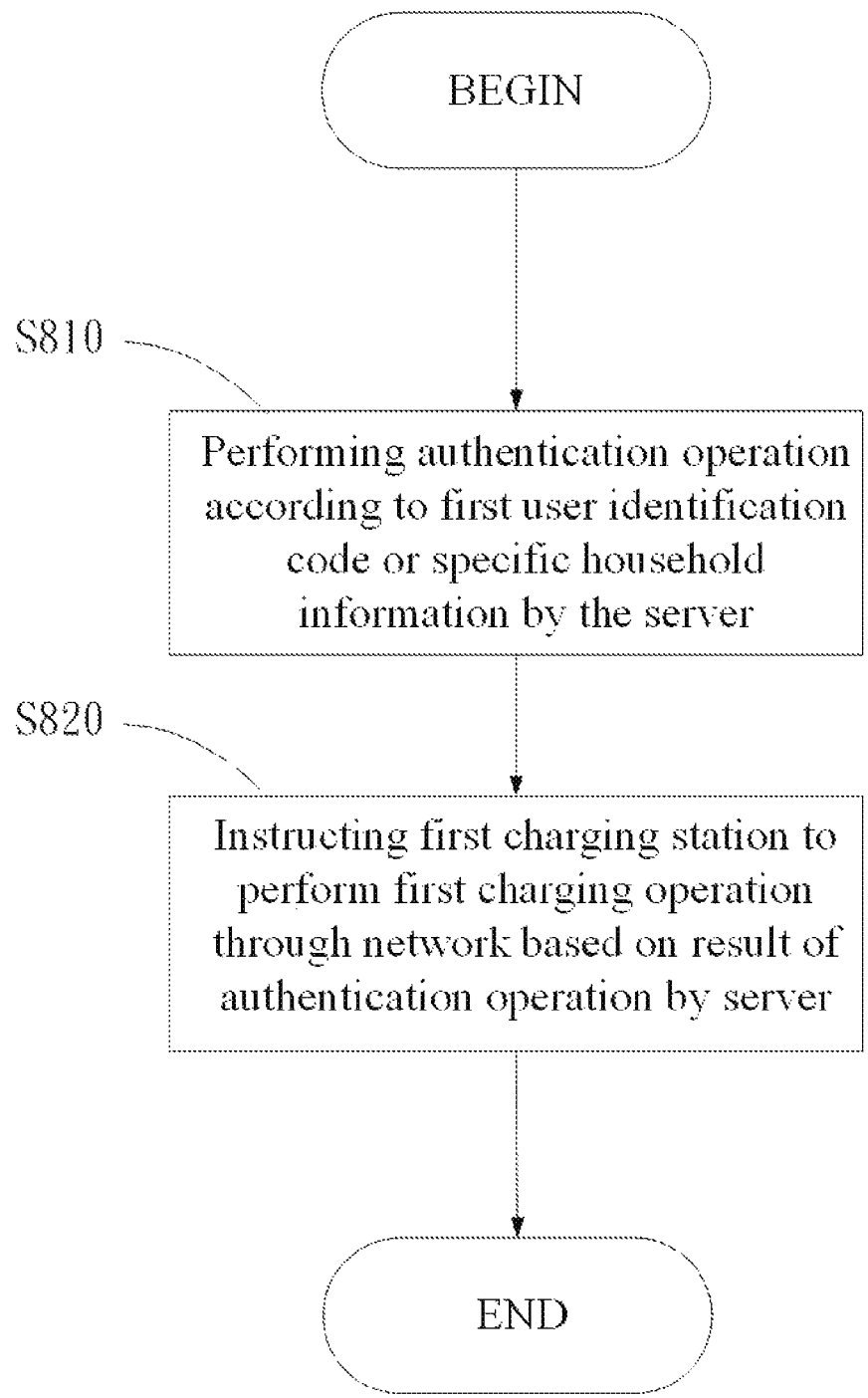
FIG. 8 is a flowchart of another embodiment of an electric vehicle charging management method for community users of the invention.

FIG. 8 is a flowchart of another embodiment of an electric vehicle charging management method for community users of the invention. In this embodiment, the server can perform an authentication operation for charging requirements. Through the authentication operation, the validity of the corresponding user can be determined for the management of subsequent charging operations. First, in step S810, the server performs an authentication operation according to the first user identification code and/or the specific household information, and in step S820, according to the result of the authentication operation, the server instructs the first charging station to perform the first charging operation through the network.

Figure 9:
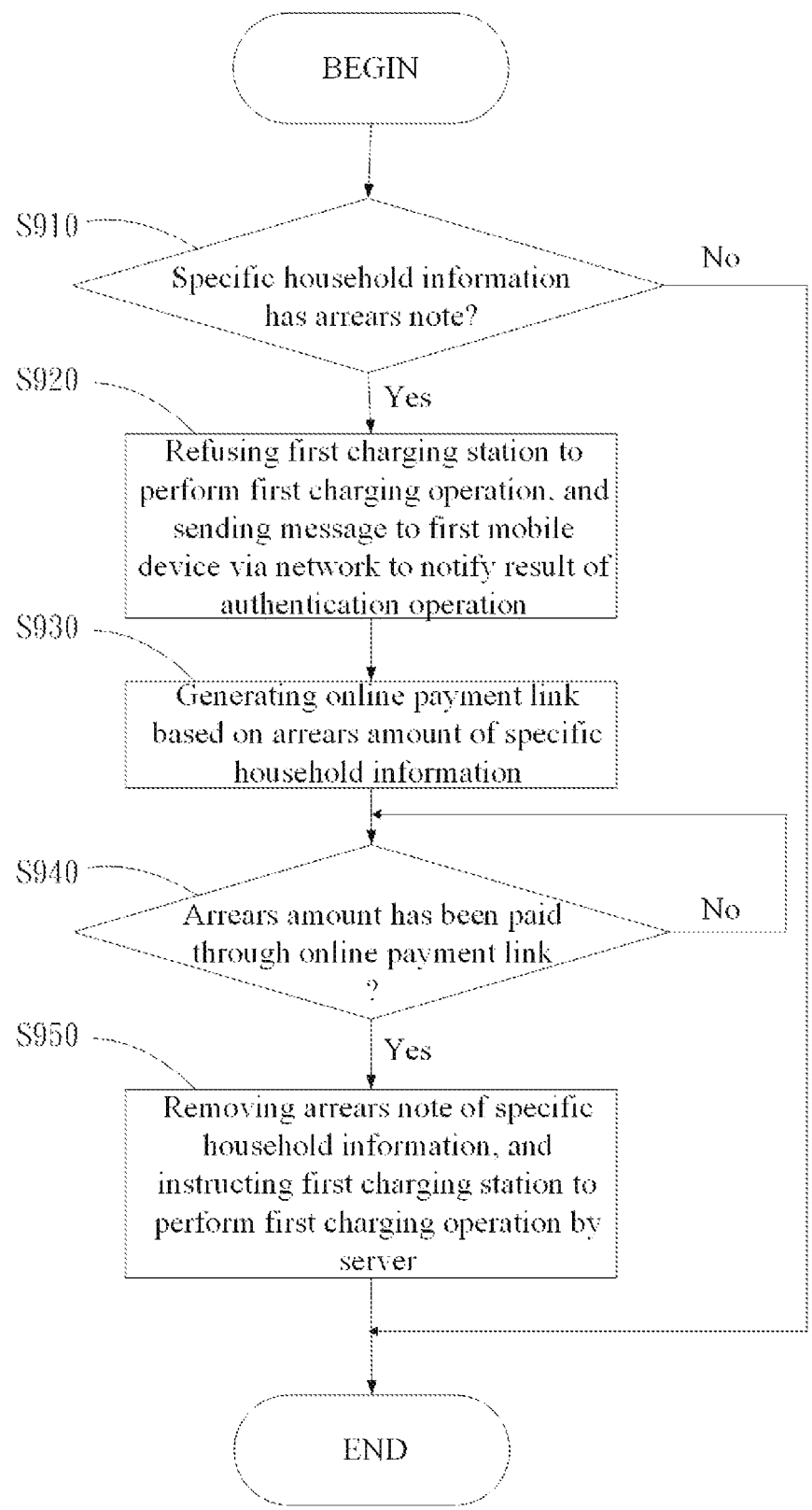
FIG. 9 is a flowchart of another embodiment of an authentication method of the invention.

FIG. 9 is a flowchart of an embodiment of an authentication method of the invention.

First, in step S910, the server determines whether the specific household information has an arrears note. As mentioned above, the database of the server can record whether individual households have arrears, such as an arrears note of management fee or charging fee. When the specific household information does not have an arrears note (No in step S910), the flow is ended. When the specific household information has an arrears note (Yes in step S910), in step S920, the server refuses the first charging station to perform the first charging operation, and sends a message to the first mobile device through the network to notify the result of the authentication operation. Next, in step S930, the server generates an online p neat link based on the arrears amount of the specific household information. It should be noted that, in some embodiments, the online payment link can be transmitted to the first mobile device together with the message of step S920. The user of the first mobile device can use the online payment link to make online payment for their unpaid fees. Next, in step S940, the server determines whether the arrears amount owed by the specific household information has been paid through the online payment link. When the arrears amount does not pay through the online payment link (No in step S940), the flow continues the determination in step S940. When the arrears amount has been paid through the online payment link (Yes in step S940), in step S950, the server removes the arrears note of the specific household information in the database, and instructs the first charging station to perform the first charging operation through the network.

Figure 10:
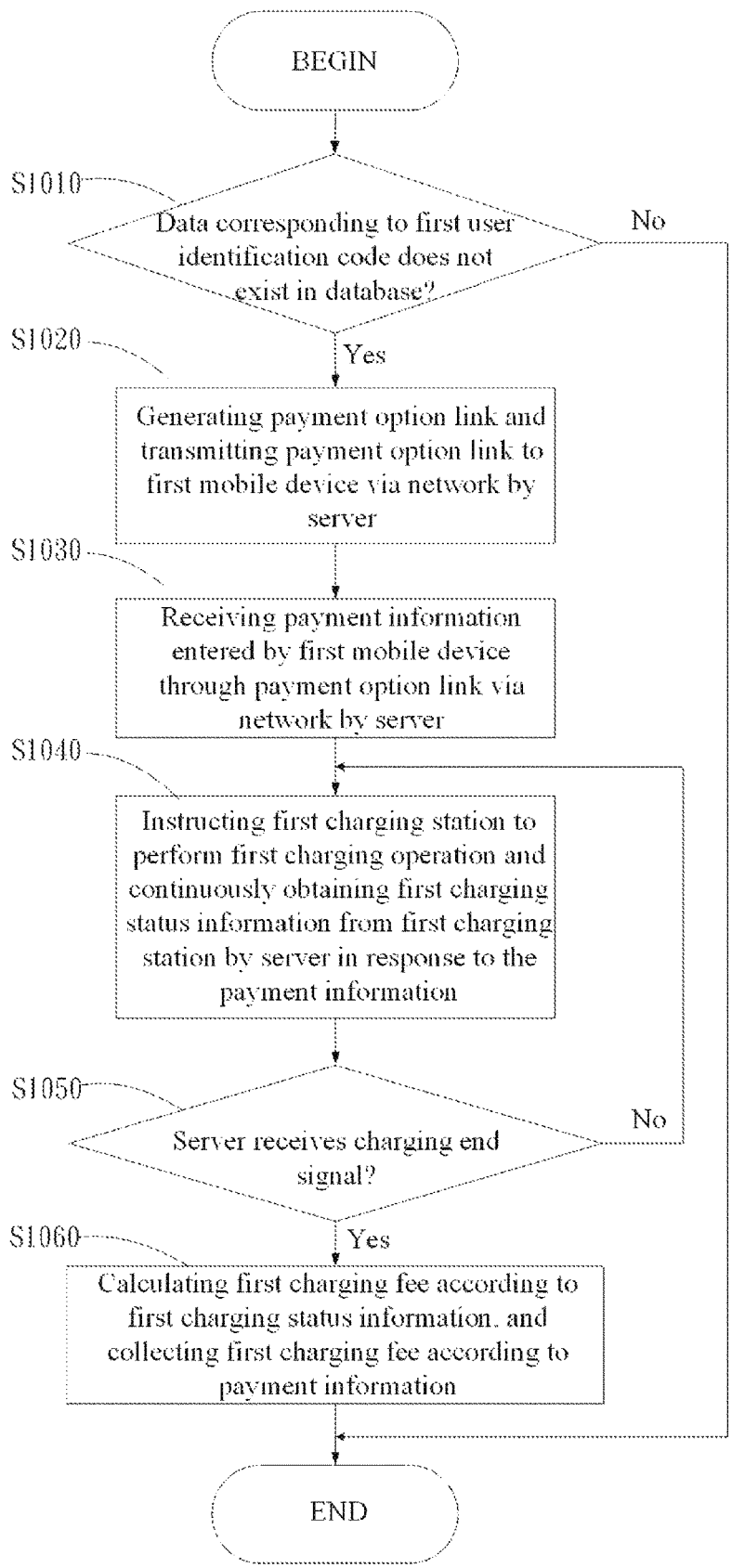
FIG. 10 is a flowchart of another embodiment of an electric vehicle charging management method for community users of the invention.

FIG. 10 is a flowchart of another embodiment of an electric vehicle charging management method for community users of the invention. The electric vehicle charging management method for community users of the invention can be applied to a charging field of a community. The charging field includes a plurality of electric vehicle charging stations and has a power limit. Individual electric vehicle charging stations can be electrically coupled with a remote server through a network. In this embodiment, the electric vehicle charging station in the community can provide non-residents for charging operation.

As mentioned above, the server receives a first charging request from a first charging station or a first mobile device through the network. The first charging request includes at least a first user identification code and a first charging station identification code of the first charging station. It should be noted that in some embodiments, a user can connect the electric vehicle EV1 and the first charging station to each other, such as plugging the charging gun into the charging interface of the electric vehicle, to send the charging request corresponding to the first charging station. In some embodiments, the server may directly or indirectly receive a charging request from a mobile device of the owner of the electric vehicle EV1. It is noted that in some embodiments, the user can scan a QR code on the first charging station through the scanning function of the application to generate the charging request. In some embodiments, the user can use an application in the mobile device to select the first charging station and execute an activation function to generate the above-mentioned charging request. In some embodiments, the owner of the electric vehicle EV1 can use an MID card to approach the induction area on the first charging station to generate a corresponding charging request. The server can retrieve a database based on the first user identification code. First, in step S1010 the server determines whether there is data corresponding to the first user identification code in the database. When the data of the corresponding first user ID exists in the database (No in step S1010), the flow is ended. When the data corresponding to the first user ID does not exist in the database (Yes in step S1010), in step S1020, the server generates a payment option link and transmits the payment option link to the first mobile device via the network. Next, in step S1030, the server receives the payment information entered by the first mobile device through the payment option link through the network. It should be noted that, in some embodiments, the payment information can be credit card information, mobile payment and other information. Then, in step S1040, the server instructs the first charging station to perform the first charging operation through the network according to the payment information, and continues to obtain the first charging status information of the first charging operation from the first charging station. Similarly, the first charging status information may include at least a charging time or a charging amount of power. It should be noted that the first charging status information includes at least a charging time or a charging amount of power. Next, in step S1050, the server determines whether a charging end signal is received. It should be noted that in some embodiments, when the user pulls the charging gun out of the charging station, the charging station can send the charging end signal to the server. In some embodiments, when the charging operation of the electric vehicle is completed, in other words, when the electric vehicle is fully charged, the charging station can transmit the charging end signal to the server. In addition, in some embodiments, the user can use the application in the mobile device to execute a charging end function to send a charging end signal to the server. When the server does not receive the charging end signal (No in step S1050), the flow continues the operation of step S1040. When the server receives the charging end signal (Yes in step S1050), in step S1060, it calculates first charging fee according to the first charging status information, and collects the first charging fee according to the payment information.

Figure 11:
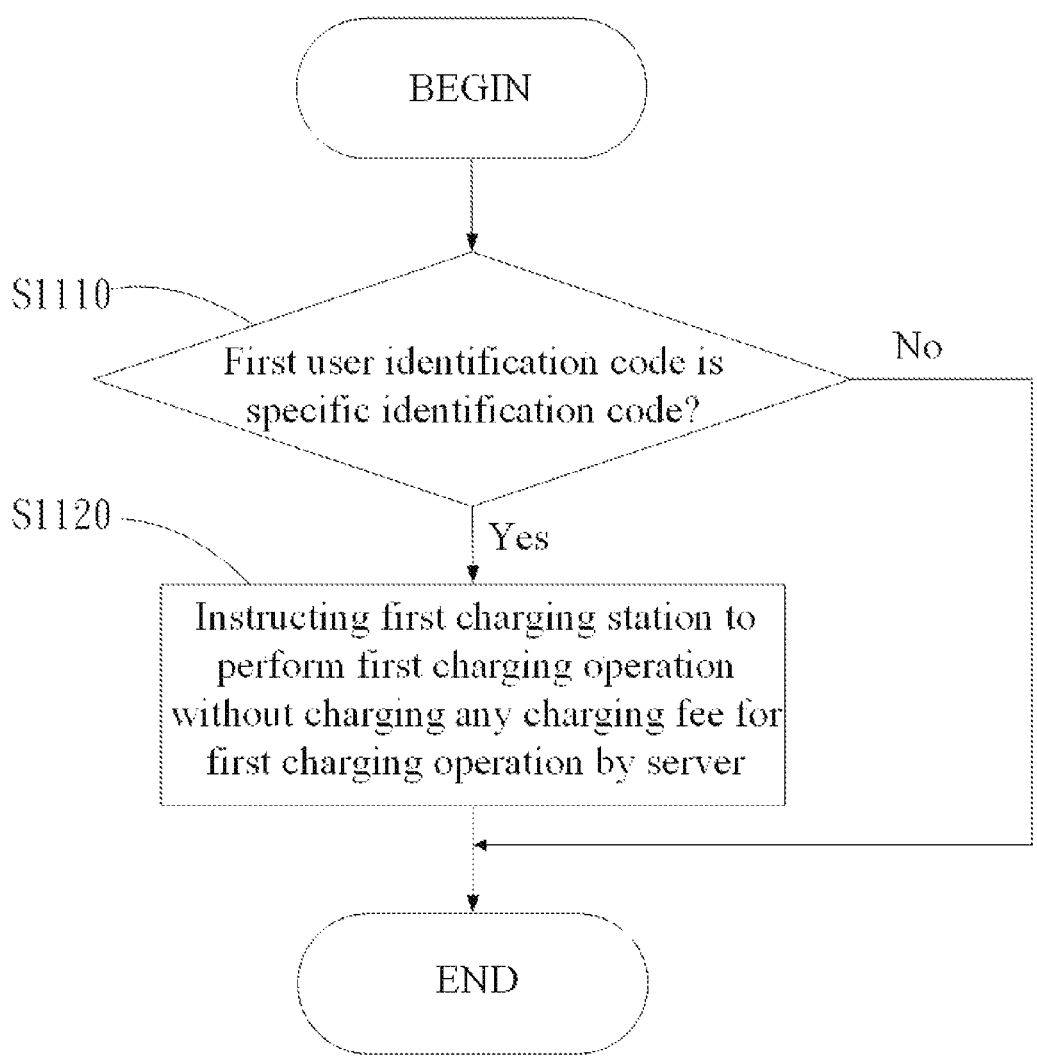
FIG. 11 is a flowchart of another embodiment of an electric vehicle charging management method for community users of the invention.

FIG. 11 is a flowchart of another embodiment of an electric vehicle charging management method for community users of the invention. In this embodiment, the community can provide free charging services for specific users, such as guests. First, in step S1110, it is determined whether the first user identification code is a specific identification code. It is noted that the specific identification code can be set in the database of the server in advance. When the first user identification code is not a specific identification code (No in step S1110), the flow is ended. When the first user identification code is a specific identification code (Yes in step S1110), in step S1120, the server instructs the first charging station to perform the first charging operation through the network without charging any charging fee for the first charging operation. In other words, no charging fees and bills will be generated.

Therefore, the electric vehicle charging management methods and systems for community users of the present invention can perform the charging management of the charging stations in the community, thus relieving the trouble in electric vehicle charging for community electric vehicle users in the community and increasing the management flexibility of the community for charging and billing at the charging station.

Electric vehicle charging management methods for community users, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electric vehicle charging management method for community users applied to a charging field, wherein the charging field comprises a plurality of electric vehicle charging stations and a server connected to the electric vehicle charging stations through a network, the method comprising:
   receiving a charging request via the network from a first charging station of the electric vehicle charging stations or a first mobile device by the server, wherein the charging request includes at least a user identification code and a first charging station identification code corresponding to the first charging station;
   retrieving specific household information in a community from a database according to the first user identification code by the server;

instructing the first charging station corresponding to the first charging station identification code to perform a first charging operation through the network by the server;

continuously obtaining first charging status information from the first charging station through the network by the server, wherein the first charging status information includes at least a charging time or a charging power;

receiving a charging end signal from the first charging station through the network by the server;

in response to the charging end signal, calculating a charging fee based on the first charging status information, and generating bill information for the specific household information in the community based on the charging fee by the server;

receiving a second charging request via a network from a second charging station or a second mobile device by the server, wherein the second charging request includes at least a second user identification code and a second charging station identification code corresponding to the second charging station;

retrieving the specific household information in the community from the database according to the second user identification code by the server, wherein the first user identification code and the second user identification code both correspond to the specific household information;

instructing the second charging station to perform a second charging operation through the network, and continuously obtaining second charging status information from the second charging station by the server; and in response to the charging end signal, calculating a second charging fee according to the second charging status information, and integrating the second charging fee into the bill information corresponding to the specific household information by the server.

2. The method of claim 1, further comprising connecting to a management fee calculation system in the community via the network to integrate the first charging fee into a management fee receipt corresponding to specific household information by the server.

3. The method of claim 1, further comprising:
providing a charging rate table, wherein the charging rate table includes a peak charging rate and an off-peak charging rate; and
calculating the first charging fee based on the first charging status information and the charging rate table by the server.

4. The method of claim 1, further comprising:
performing an authentication operation according to the first user identification code or the specific household information by the server; and
instructing the first charging station to perform the first charging operation through the network according to the result of the authentication operation by the server.

5. The method of claim 4, wherein the authentication operation further comprises the steps of:
determining whether the specific household information has an arrears note; and
when the specific household information has the arrears note, refusing the first charging station to perform the first charging operation, and sending a message to the first mobile device via the network to notify the result of the authentication operation by the server.

6. The method of claim 5, further comprising:
generating an online payment link based on the arrears amount of the specific household information by the server;
determining whether the arrears amount has been paid through the online payment link by the server; and
when the amount of arrears has been paid through the online payment link, removing the arrears note of the specific household information, and instructing the first charging station to perform the first charging operation through the network by the server.

7. The method of claim 1, further comprising:
when the data corresponding to the first user identification code does not exist in the database, generating a payment option link and transmitting the payment option link to the first mobile device via the network by the server;
receiving payment information entered by the first mobile device through the payment option link through the network by the server;
in response to the payment information, instructing the first charging station to perform the first charging operation through the network by the server;
continuing to obtain the first charging status information of the first charging operation from the first charging station by the server;
receiving the charging end signal corresponding to the first charging operation through the network by the server; and
in response to the charging end signal, calculating the first charging fee according to the first charging status information, and collecting the first charging fee according to the payment information by the server.

8. The method of claim 1, further comprising:
determining whether the first user identification code is a specific identification code; and
when the first user identification code is the specific identification code, instructing the first charging station to perform the first charging operation through the network without charging any charging fee for the first charging operation by the server.

9. An electric vehicle charging management system for community users applied to a charging field, comprising:
a plurality of electric vehicle charging stations, at least including a first charging station; and
a server connecting to the respective electric vehicle charging station of the charging field via a network, receiving a charging request from the first charging station or a first mobile device, wherein the charging request includes at least a user identification code and a first charging station identification code corresponding to the first charging station, retrieving specific household information in a community from a database according to the first user identification code, instructing the first charging station corresponding to the first charging station identification code to perform a first charging operation through the network, continuously obtaining first charging status information from the first charging station through the network, wherein the first charging status information includes at least a charging time or a charging power, receiving a charging end signal from the first charging station through the network by the server, and in response to the charging end signal, calculating a charging fee based on the charging status information, and generating bill information for the specific household information in the community based on the charging fee, wherein the server further receives a second charging request via a network from a second charging station or a second mobile device, wherein the second charging request includes at least a second user identification code and a second charging station identification code corresponding to the second charging station, retrieves the specific household information in the community from the database according to the second user identification code, wherein the first user identification code and the second user identification code both correspond to the specific household information, instructs the second charging station to perform a second charging operation through the network, and continuously obtains second charging status information from the second charging station, and in response to the charging end signal, calculates a second charging fee according to the second charging status information, and integrates the second charging fee into the bill information corresponding to the specific household information by the server.

10. The system of claim 9, wherein the server further connects to a management fee calculation system in the community via the network to integrate the first charging fee into a management fee receipt corresponding to specific household information.

11. The system of claim 9, wherein the server further provides a charging rate table, wherein the charging rate table includes a peak charging rate and an off-peak charging rate, and calculates the first charging fee based on the first charging status information and the charging rate table.

12. The system of claim 9, wherein the server further performs an authentication operation according to the first user identification code or the specific household information, and instructs the first charging station to perform the first charging operation through the network according to the result of the authentication operation.

13. The system of claim 12, wherein the authentication operation further comprises the server determining whether the specific household information has an arrears note and when the specific household information has the arrears note, refusing the first charging station to perform the first charging operation, and sending a message to the first mobile device via the network to notify the result of the authentication operation.

14. The system of claim 13, wherein the server further generates an online payment link based on the arrears amount of the specific household information, and determines whether the arrears amount has been paid through the online payment link, and when the amount of arrears has been paid through the online payment link, the server removes the arrears note of the specific household information, and instructs the first charging station to perform the first charging operation through the network.

15. The system of claim 9, wherein when the data corresponding to the first user identification code does not exist in the database, the server further generates a payment option link and transmitting the payment option link to the first mobile device via the network, receives payment information entered by the first mobile device through the payment option link through the network, in response to the payment information, instructs the first charging station to perform the first charging operation through the network, continues to obtain the first charging status information of the first charging operation from the first charging station, receives the charging end signal corresponding to the first charging operation through the network and in response to the charging end signal, calculates the first charging fee according to the first charging status information, and collects the first charging fee according to the payment information.

16. The system of claim 9, wherein the server further determines whether the first user identification code is a specific identification code, and when the first user identification code is the specific identification code, instructs the first charging station to perform the first charging operation through the network without charging any charging fee for the first charging operation.

17. A machine-readable storage medium comprising a computer program, which, when executed, causes a device to perform an electric vehicle charging management method for community users for use in a charging field with a plurality of electric vehicle charging stations and the electric vehicle charging stations are connected to a server through a network, wherein the method comprises:
  receiving a charging request via the network from a first charging station of the electric vehicle charging stations or a first mobile device by the server, wherein the charging request includes at least a user identification code and a first charging station identification code corresponding to the first charging station;
  retrieving specific household information in a community from a database according to the first user identification code by the server;
  instructing the first charging station corresponding to the first charging station identification code to perform a first charging operation through the network by the server;
  continuously obtaining first charging status information from the first charging station through the network by the server, wherein the first charging status information includes at least a charging time or a charging power;
  receiving a charging end signal from the first charging station through the network by the server; and
  in response to the charging end signal, calculating a charging fee based on the first charging status information, and generating bill information for the specific household information in the community based on the charging fee by the server;
  receiving a second charging request via a network from a second charging station or a second mobile device by the server, wherein the second charging request includes at least a second user identification code and a second charging station identification code corresponding to the second charging station;
  retrieving the specific household information in the community from the database according to the second user identification code by the server, wherein the first user identification code and the second user identification code both correspond to the specific household information;
  instructing the second charging station to perform a second charging operation through the network, and continuously obtaining second charging status information from the second charging station by the server; and
  in response to the charging end signal, calculating a second charging fee according to the second charging status information, and integrating the second charging fee into the bill information corresponding to the specific household information by the server.

* * * * *